(No Model.)

A. M. LONG.
INHALER.

No. 313,745. Patented Mar. 10, 1885.

Witnesses
Jos. S. Latimer
A. J. Willard

Inventor
Amos M. Long
By his Attorney
A. Bell

UNITED STATES PATENT OFFICE.

AMOS M. LONG, OF MONROE, MICHIGAN.

INHALER.

SPECIFICATION forming part of Letters Patent No. 313,745, dated March 10, 1885.

Application filed January 8, 1885. (No model.)

*To all whom it may concern:*

Be it known that I, AMOS M. LONG, a citizen of the United States, resident of Monroe, county of Monroe, and State of Michigan, have invented a new and useful Improvement in Inhalers, of which the following is a specification.

The object of my invention is to provide in an inhaler simple and effective means for supplying nitrous-oxide gas, and for regulating the inhalation and exhalation thereof.

My improvement has special reference to the construction and arrangement of the valve for admitting the flow of gas and for discharging the same after it has been inhaled, and to the mechanism employed for operating them, as will be more fully set forth hereinafter.

Figure 1:
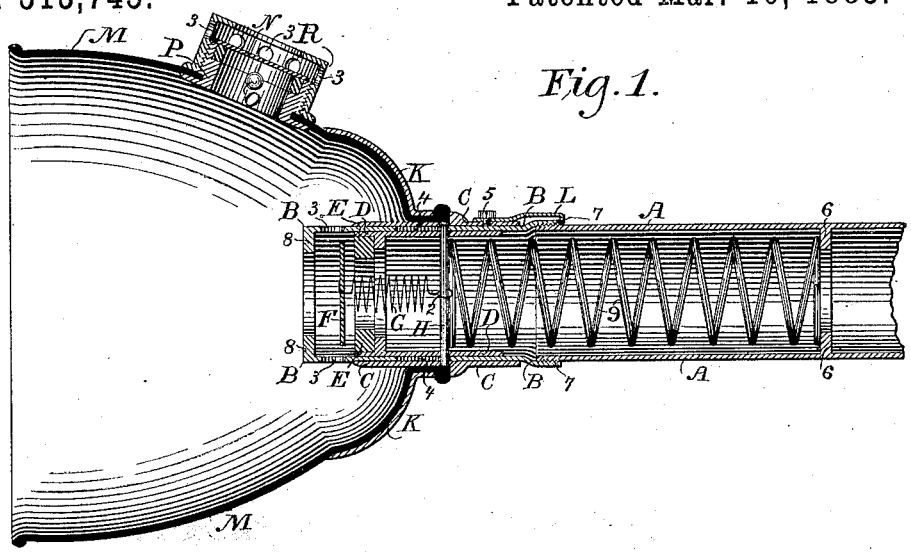
Figure 2:
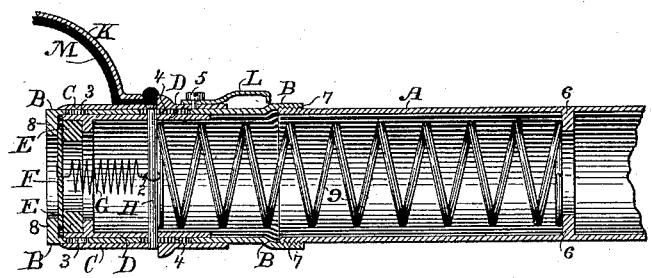
Figure 3:
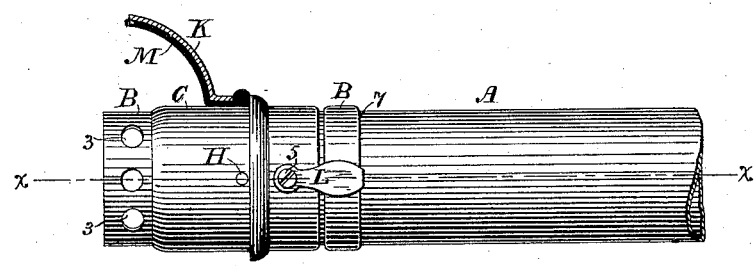

Figure 1 represents a longitudinal sectional view of the inhaler open for the flow of gas from the holder, drawn on line $x$ $x$ of Fig. 3. Fig. 2 represents a similar view of the inhaler-tube closed against the flow of gas. Fig. 3 represents a perspective view of the inhaler-tube open for the flow of gas.

Like figures and letters indicate like parts.

A is the lower section of the inhaler-tube, to which the rubber pipe leading from the gas-holder is attached.

B is an intermediate tube, forming the upper section of the inhaler-tube, and is joined to $a$ at 7 by means of a screw and thread. At the head of tube B, and made a part thereof, is an annular projection or ring, $d$, which lessens the opening in said tube and forms an outer seat for valve F when the flow of gas from the holder is cut off, as shown in Fig. 2.

C is an outer tube, and D an inner tube, both having a corresponding longitudinal movement along the intermediate tube, B, by means of pin H, passing through C and D, and having free play in slots 4 4, formed in the intermediate tube, B.

E is the seat for valve F, formed within tube D. The forward movement of tubes C and D causes the disk of valve F to be pressed between seat E and ring 8, and thus cuts off the supply of gas from the holder.

3 3 represent openings in the intermediate tube, B, for the outer passage of gas. (Best shown in Fig. 3.)

G is a light spring supporting the disk of valve F. It rests upon pin H, and is secured thereto by means of an eye, 2, in the spring, through which pin H passes.

When the inhaler is open for the flow of gas, as shown in Fig. 1, the outward pressure of the breath is sufficient to close valve F by depressing spring G and to open the exhalation-valve N in the rubber hood M. The last-named valve, as soon as the outward pressure is relieved, returns to its seat P by means of weight O, pendent from said valve.

R is a cage covering valve $n$, and is secured to the hood by means of a circular base, to which it is screwed, said base having grooved sides, into which the rubber forming the hood closely fits. The spring 9 rests upon an annular projection, 6, in tube A, and is operated by pin H, against which its upper end bears. The rubber hood is held in position on outer tube, C, by means of a metallic collar, K, fitting over the neck of the hood and firmly holding it to said tube. The neck of the hood pressing upon the outer ends of pin H prevents said pin from being displaced.

The inhaler is operated as follows: When ready to administer the gas, the hood is held against the face of the patient so as to cover both the nose and the mouth. A slight pressure toward the face upon tube A opens the valve F, and the gas flows from the holder. The thumb-catch L, secured to tube C, at 5, falls into place behind the lower end of intermediate tube, B, thus holding the valve open. The flow of gas is cut off by simply releasing the catch L, when the several parts of the inhaler assume the positions shown in Fig. 2. By this construction I dispense with the usual cut-off valve operated by an arm through the inhaler-case and make a single valve perform the functions of the cut-off and inhalation valves. When the valve is open, as shown in Fig. 1, the valve F acts as an inhalation-valve, when closed, as in Fig. 2, as a cut-off valve.

The advantages claimed for my device are that it is not liable to get out of order, the absence of levers to operate the valves, and there is no projection on the tube to be in the way of the operator.

What I claim as new and of my invention, and for which I ask Letters Patent of the United States, is—

1. In an inhaler, the combination of tube A, intermediate tube, B, having slots 4 4 therein, inner tube, D, outer tube, C, pin H, valve F, springs G and 9, and thumb-catch L, substantially as set forth and described.

2. In an inhaler having a hood, the combination of outer tube, C, intermediate tube, B, having slots 4 4 therein, inner tube, D, pin H, and valve F, attached to said pin by spring G, substantially as set forth.

3. In an inhaler, the combination of tube A, intermediate tube, B, having slots 4 4 therein, pin H, valve F, attached to pin H by spring G, outer tube, C, inner tube, D, spring 9, and thumb-catch L, substantially as set forth and described.

AMOS M. LONG.

Witnesses:
BASCOM MEREDITH,
E. R. GILDERY.